United States Patent Office 2,989,409
Patented June 20, 1961

2,989,409
DEXTRAN CONTAINING SIZING COMPOSITION
Malvern J. Hiler, Dayton, Ohio, assignor to The Commonwealth Engineering Company of Ohio, Dayton, Ohio
No Drawing. Original application Sept. 2, 1955, Ser. No. 532,373, now Patent No. 2,880,105, dated Mar. 31, 1959. Divided and this application June 17, 1958, Ser. No. 742,974
5 Claims. (Cl. 106—162)

This invention relates to new and novel sizing compositions for textiles and the like. More particularly, the invention relates to sizing compositions comprising dextran and an aldehydo quaternary ammonium salt, and adapted to be insolubilized by heat in situ on a textile or the like.

Dextran is a high molecular weight polysaccharide of more or less branched structure and made up of anhydroglucopyranosidic units joined by molecular structural repeating linkages at least 50%, and usually the majority of which, are alpha-1,6 linkages. It may vary widely with respect to the ratio of alpha 1,6 to non-1,6 linkages, its molecular weight and sensitivity to water, and may be readily water-soluble, difficultly water-soluble or substantially water-insoluble.

Dextran may be obtained in various ways including bacterial conversion of 1,4 linkages of dextrin to 1,6 linkages of dextran. Usually, it is biosynthesized from sucrose. Thus, a suitable dextran-producing becterium, such as those of the *Leuconostoc mesenteroides* or *L. dextranicum* types may be cultivated and the whole culture, or a filtrate therefrom containing the enzyme dextransucrase, introduced into an aqueous culture medium containing sucrose and appropriate inorganic salts and nitrogenous material, the mass being held until the dextran is synthesized in maximum yield.

The dextran thus obtained normally has a high molecular weight calculated to be in the millions. It may be precipitated from the culture medium by means of a water-miscible aliphatic alcohol or ketone such as methanol, ethanol, isopropanol or acetone. The precipitate may be purified and reduced to powdered condition for admixture with the aldehydo quaternary ammonium salt.

Instead of using the high molecular weight dextran as one starting reactant dextran of lower molecular weight may be used. The relatively low molecular weight dextran may be obtained directly by known methods in accordance with which the synthesis from sucrose is effected under controlled conditions using the enzyme elaborated by the bacterium and in the substantial absence of bacteria and cellular debris. As is known, this synthesis by the so-called "filtered enzyme" method can be conducted so that at least the major portion of the dextran obtained has a molecular weight ranging from 20,000 to 200,000 (average 60,000 to 80,000). Such dextran may be used in the present process. Or the native dextran may be partially hydrolyzed by acid or enzyme action to dextran of lower molecular weight. In general, the dextran may have a molecular weight between 5,000 and that of the native product, determined by light scattering measurements.

The dextran selected for the present purpose is one which is soluble or dispersible in water.

Aldehydo quaternary ammonium salts which may be used can be represented by the formula

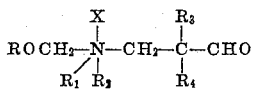

in which R is an aliphatic, arylaliphatic or hydroarylaliphatic group having at least one hydrogen atom on the carbon atom attached to the ether oxygen atom, $R_1$ and $R_2$ are individually, aliphatic or cycloaliphatic groups or, when taken together, represent divalent saturated aliphatic radicals which, with the nitrogen atom, form a heterocycle, $R_3$ is hydrogen or an alkyl radical, $R_4$ is hydrogen or an aliphatic hydrocarbon group, and X is halogen. Thus, R may be any primary or secondary aliphatic type group such as methyl, ethyl, allyl, isopropyl, methallyl, butyl, sec. butyl, amyl, sec. amyl, capryl, octyl, decyl, undecenyl, dodecyl, cetyl, 9,10-hexahydrobenzyl, cyclohexyl, terbutylphenoxyethyl, and so on. Groups $R_1$ and $R_2$ may be the same or different, may be derived from any strongly basic non-aromatic secondary amine, and may be methyl, ethyl, hydroxyethyl, propyl, allyl, butyl, capryl, octyl, dodecyl, cyclohexyl, etc. Groups $R_1$ and $R_2$ together may form a divalent aliphatic group, the secondary amine being heterocyclic as in morpholine, pyrol, piperidine, etc. When $R_3$ is not hydrogen, it may be an alkyl group such as methyl, ethyl, propyl, isopropyl, etc. $R_4$ may also be hydrogen or an aliphatic hydrocarbon group. $R_3$ and $R_4$ result from the aldehydes acetaldehyde, propionaldehyde, isobutyraldehyde, valeraldehyde, dodecaldehyde, 9,10-octadecenaldehyde, octadecaldehyde, etc. Specific aldehyde quaternary ammonium salts which may be mixed with the dextran include ethoxymethyl dimethyl B-methyl-B-formyl-propyl ammonium chloride of formula

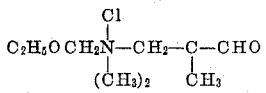

butoxymethyl dimethyl B-methyl-B-formyl-propyl ammonium chloride

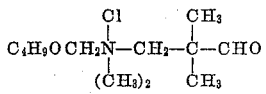

capryloxymethyl B-formyl-ethyl-diethyl ammonium chloride,

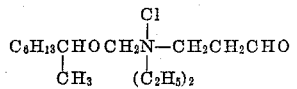

allyloxymethyl B-formyl-propyl piperidinium chloride

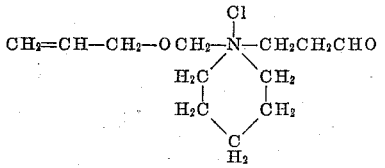

phenoxyethoxymethyl B-formyl-propyl morpholinium chloride

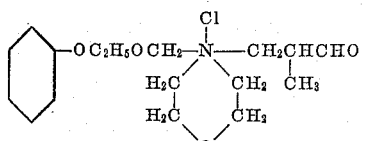

and butoxymethyl dimethyl B-formyl-octadecyl ammonium chloride

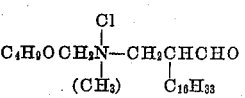

As is known, these aldehydo quaternary ammonium halides can be produced by reacting a halomethyl ether of the formula $ROCH_2X$ with an aminomethyl aldehyde (obtained by condensing a secondary amine, formaldehyde, and an aldehyde having at least one hydrogen on the alpha-carbon) of the

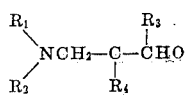

in which $R_1$, $R_2$, $R_3$, and $R_4$ represent the groups or radicals mentioned above.

It is found that the aldehydo quaternary ammonium halides react with water-soluble water-dispersible dextrans under heating to form insoluble complexes and that, as a result of the more or less branched structure of the dextran and the varying ratio of 1,6 to non-1,6 linkages of the dextrans, the complexes exhibit special characteristics which distinguish them from similar complexes obtained by reacting the linear 1,4 linked polymer, cellulose, with the quaternary halides.

The dextran may be mixed with water to form a paste and the selected aldehydo quaternary ammonium halide incorporated in the paste in the form of an aqueous solution of suitable concentration and at ordinary temperature to obtain a mixture of the unreacted dextran and halide and that may be marketed in the paste condition for application as such or after suitable dilution with water, to the fabric, paper or other article to be sized, for mixing with paper pulp, a suspension of discontinuous fibers intended to be formed into a non-woven fabric, and so on. After the mixture has been applied to the fabric or mixed with a fiber suspension, the fabric or fibers (after deposition from the suspension) may be heated to effect reaction between the dextran and ammonium halide, whereby the insoluble complex is formed in and on the fibers. Temperatures between 60° C. and 100° C. may be used to effect the reaction, the heating time depending on and varying inversely with the temperature between about 5 to 10 minutes and one-half hour or somewhat longer. It is also possible to heat the paste comprising the dextran and ammonium halide to effect a controlled, limited reaction of those ingredients and then complete the reaction on the fibers of the textile, paper or the like but that is not the presently preferred procedure. The paste may be applied to a fabric, film, paper sheet or the like by means of any suitable spreading device such as a doctor blade, and the excess removed to leave a thin coating of the mix on the base, which may then be dried at temperatures such that the insoluble complex is formed during the drying step. When the mixture is to be used as a beater size, a suitable quantity of the paste may be dispersed in the aqueous suspension of the fibers in the beater. In many instances, when fabrics, films, sheets, filamentary tows and the like are to be sized, it may be found more convenient to disperse the paste or mixture in water to obtain a bath in which the material to be sized is immersed or through which such material is advanced in a continuous manner.

Dextran has film-forming properties. However, the films produced from dextran as such have the disadvantage of being soluble in water or having such a marked water pick-up and retention capacity that the usefulness of the films for many purposes is impaired. The mixture of dextran and quaternary ammonium salt may be dispersed in water and cast to clear transparent films which, on heating, are toughened and insolubilized so that they are adapted to use under varying conditions, even involving direct exposure to moisture, without stalubilization or weakening due to water pick-up.

The relative proportions of dextran and ammonium halide may vary. Thus, the ratio of halide to dextran in the paste or aqueous dispersion may vary from 50:1 to 1:50.

The following examples are given as illustrative of specific compositions in accordance with the invention, it being understood that these examples are not limitative.

*Example I*

About 8% by weight of native (unhydrolyzed) water-soluble dextran is mixed with sufficient water to form a paste. Five parts of the paste are mixed with one part of a 50% aqueous solution of dodecycloxymethyl dimethyl B-methyl-B-formyl-propyl ammonium chloride.

*Example II*

The paste of Example I is dispersed in sufficient water to obtain a thin sizing bath.

*Example III*

A 5% aqueous solution of hydrolyzed dextran having molecular weight ranging from 20,000 to 200,000 is prepared. Five parts of the solution are mixed with one part of an aqueous 50% solution of decyloxymethyl dimethyl B-methyl-B-formyl propyl ammonium chloride to obtain a mass suitable for dilution with water to produce a size for textiles and paper.

*Example IV*

A 5% aqueous paste of native unhydrolyzed dextran is prepared and 10 parts thereof are mixed with 0.5 part of 2-ethylhexoxy-methyl dimethyl-B-methyl-B-formyl propyl ammonium bromide to obtain a paste for dilution with water and use as a size.

*Example V*

The composition of Example I is spread on a cotton fabric and the excess is removed using a doctor blade. The treated fabric is then dried, heated to 100° C. for 30 minutes and thereafter washed with soap solution and dried. The final fabric has a full crisp finish which persists after further repeated laundering.

*Example VI*

A spun rayon fabric is passed through bath of Example II, withdrawn from the bath, squeezed to remove excess treating solution, dried and heated to 110° C. for about 30 minutes. The treated fabric has a stiffened "hand" which is lasting and retained when the fabric is laundered.

*Example VII*

An aqueous dispersion of a mixture of 10 parts of a paste containing 5% of unhydrolyzed native dextran and one part of butoxymethyl B-formyl dodecyl dimethyl ammonium chloride is cast to a film by pouring it onto a glass plate. The film is air-dried, removed from the plate and heated to 130° C. in an oven for five minutes. The resulting clear, flexible film is resistant to moisture.

Various changes and modifications may be made in practicing the invention without departing from the spirit and scope thereof and, therefore, it is to be understood that the invention is not to be limited except as defined in the appended claims.

This application is a division of application Serial No. 532,373, filed September 2, 1955, now U.S. Patent No. 2,880,105, granted March 31, 1959.

What is claimed is:

1. A sizing composition consisting essentially of an aqueous mixture composed of ten parts by weight of a paste containing one part by weight of butoxymethyl-B-formyl-dodecyl dimethyl ammonium chloride and 5% by weight of water-soluble unhydrolyzed native dextran.

2. A sizing composition consisting essentially of an aqueous mixture composed of five parts by weight of a paste mixed with one part by weight of a 50% aqueous solution of dodecyloxymethyl-dimethyl-B-methyl-B-formyl-propyl ammonium chloride, said paste consisting of 8% by weight of native unhydrolyzed water-soluble dextran mixed with sufficient water to form a paste.

3. A process for producing an insoluble dextran sizing product which comprises mixing dextran with butoxymethyl dimethyl-B-methyl-B-formyl-propyl ammonium chloride in the presence of water, and thereafter drying and heating the mixture to form an inosluble complex of the dextran and ammonium salt, in proportionate amounts by weight of ammonium salt to dextran of from 50:1 to 1:50.

4. A process for producing an insoluble dextran sizing product which comprises mixing dextran with 2-ethylhexoxy methyl dimethyl-B-methyl-B-formyl propyl ammonium chloride in the presence of water, and thereafter drying and heating the mixture to form an insoluble complex of the dextran and ammonium salt, in proportionate amounts by weight of ammonium salt to dextran of from 50:1 to 1:50.

5. A process for producing an insoluble dextran sizing which comprises mixing dextran with ethoxymethyl dimethyl-B-methyl-B-formyl propyl ammonium chloride in the presence of water, and thereafter drying and heating the mixture to form an insoluble complex of the dextran and ammonium salt, in proportionate amounts by weight of ammonium salt to dextran of from 50:1 to 1:50.

References Cited in the file of this patent

UNITED STATES PATENTS

| | | |
|---|---|---|
| 2,291,021 | Bock | July 28, 1942 |
| 2,304,252 | Hager et al. | Dec. 8, 1942 |
| 2,602,082 | Owen | July 1, 1952 |
| 2,671,779 | Gaver et al. | Mar. 9, 1954 |
| 2,674,584 | Deniston | Apr. 6, 1954 |
| 2,853,414 | Wimmer | Sept. 23, 1958 |
| 2,880,105 | Hiler | Mar. 31, 1959 |